T. DUKE.
HORSE HAY-FORKS.
No. 185,305. Patented Dec. 12, 1876.
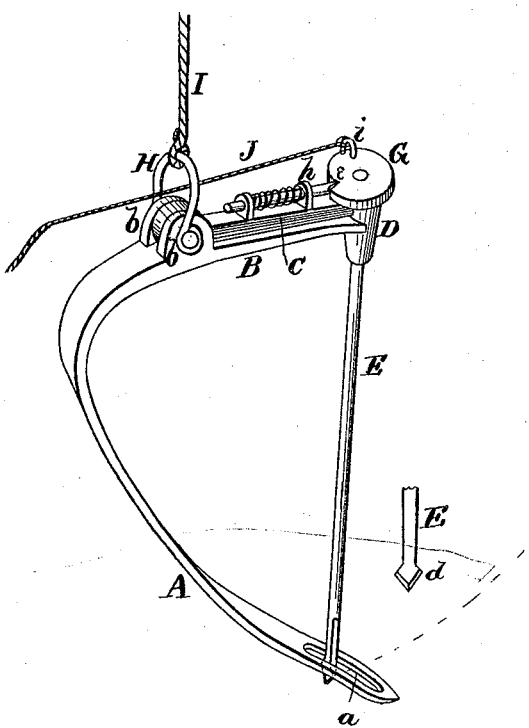
WITNESSES
Henry N. Miller
C. L. Emrich
INVENTOR
Thomas Duke,
By T. H. Alexander
Attorney.

UNITED STATES PATENT OFFICE.

THOMAS DUKE, OF HENRY, ILLINOIS.

IMPROVEMENT IN HORSE HAY-FORKS.

Specification forming part of Letters Patent No. 185,305, dated December 12, 1876; application filed August 18, 1876.

*To all whom it may concern:*

Be it known that I, THOMAS DUKE, of Henry, in the county of Marshall and State of Illinois, have invented certain new and useful Improvements in Horse Hay-Forks; and I do hereby declare that the following is a full, clear, and exact description thereof, reference being had to the accompanying drawings, and to the letters of reference marked thereon, which form part of this specification.

The nature of my invention consists in the construction and arrangement of a horse hay-fork, as will be hereinafter more fully set forth.

In order to enable others skilled in the art to which my invention appertains to make and use the same, I will now proceed to describe its construction and operation, referring to the annexed drawing, which represents a perspective of my improved hay-fork.

A represents a flat blade, pointed at its lower end, and having an elongated eye or slot, $a$. The blade is curved, as shown, and its upper portion bent forward, forming the head B, on which are formed two ears, $b$ $b$. Between these ears is pivoted an arm, C, which at its outer end has a socket, D, for the passage of the round tine E. The lower end of the tine E is formed with a spear-point, $d$, as shown, and on the upper end of the tine is a circular head, G, which has on one side a notch, $e$. On top of the arm is a spring-bolt, $h$, which enters said notch $e$ and holds the tine in place. H is a bail, to which the hoisting-rope I is attached, and J is the trip-rope, attached to a staple, $i$, or its equivalent, on the tine-head G.

When the blade A is inserted in the hay the drum C must be raised, so as to bring the tine out of the way. The tine is then brought down, so that its point $d$ will pass through the slot $a$ in the blade, after which the tine is turned to let the shoulders of the point $d$ catch on the blade and prevent its coming out, the tine being held in that position by the spring-bolt $h$ entering the slot $e$ in the tine-head G.

When it is desired to employ the fork the trip-rope J is pulled, which turns the tine one-fourth of a revolution, the spring-bolt being pushed out of the way by the eccentric edge of the head G until the point $d$ of the tine can pass out of the slot $a$ in the blade, when the arm C, with the tine, will at once raise up out of the way, and the hay be discharged.

Having thus fully described my invention, what I claim as new, and desire to secure by Letters Patent, is—

1. In a horse hay-fork, the combination of the blade A, with slot $a$, the head B, pivoted arm C, with socket D, and the rotating tine E, with spear-point $d$, substantially as and for the purposes herein set forth.

2. The combination of the rotating tine E, the head G, with notch $e$, the spring-bolt $h$, and the trip-rope J, connected to the head G, as and for the purposes herein set forth.

In testimony that I claim the foregoing as my own I affix my signature in presence of two witnesses.

THOMAS DUKE.

Witnesses:
  JNO. R. PASKELL,
  MICHAEL MURRAY.